United States Patent [19]
Bradford

[11] Patent Number: 5,916,508
[45] Date of Patent: Jun. 29, 1999

[54] METHOD OF FORMING PARTITION MATRIX

[75] Inventor: Judson A. Bradford, Holland, Mich.

[73] Assignee: Bradford Compnay, Holland, Mich.

[21] Appl. No.: 08/842,741

[22] Filed: Apr. 16, 1997

Related U.S. Application Data

[60] Division of application No. 08/600,589, Feb. 13, 1996, Pat. No. 5,732,876, which is a continuation-in-part of application No. 08/559,619, Nov. 20, 1995, Pat. No. 5,597,113.

[51] Int. Cl.⁶ .......................... B29C 45/14; B29C 65/70
[52] U.S. Cl. .......................... 264/263; 264/266; 264/267
[58] Field of Search ............................. 264/261, 248, 264/263, 267, 268, 255, 266, 273, 274; 229/120.07, 120.36, 120.38; 220/552

[56] References Cited

U.S. PATENT DOCUMENTS

| | | |
|---|---|---|
| 1,912,505 | 6/1933 | Weston . |
| 2,145,106 | 1/1939 | Anderson . |
| 2,232,632 | 2/1941 | Reynolds . |
| 2,549,801 | 4/1951 | George . |
| 2,736,483 | 2/1956 | Moore . |
| 2,842,279 | 7/1958 | Gustafson . |
| 3,067,903 | 12/1962 | Jones, Jr. . |
| 3,138,863 | 6/1964 | Clark et al. .............................. 264/261 |
| 3,253,763 | 5/1966 | Henderson . |
| 3,383,027 | 5/1968 | Brinkman et al. . |
| 3,580,471 | 5/1971 | Burke . |
| 3,640,445 | 2/1972 | Durham . |
| 3,843,039 | 10/1974 | Brown et al. . |
| 3,893,777 | 7/1975 | Jones ...................................... 264/261 |
| 3,929,534 | 12/1975 | Kay ........................................ 156/73.5 |
| 3,942,709 | 3/1976 | Gepfer . |
| 4,183,778 | 1/1980 | Mesnel ..................................... 156/245 |
| 4,226,357 | 10/1980 | Martin . |
| 4,228,912 | 10/1980 | Harris et al. ............................. 264/261 |
| 4,237,597 | 12/1980 | Auger ...................................... 264/261 |
| 4,621,764 | 11/1986 | Ragon . |
| 4,711,746 | 12/1987 | Drader .................................... 264/261 |
| 4,746,053 | 5/1988 | Nichols . |
| 4,776,481 | 10/1988 | Kidd . |
| 5,597,113 | 1/1997 | Bradford . |

FOREIGN PATENT DOCUMENTS

| | | |
|---|---|---|
| 2424873 | 12/1975 | Germany . |
| 1066615 | 4/1967 | United Kingdom . |

OTHER PUBLICATIONS

The Wiley Encyclopedia of Packaging Technology, John Wiley and Sons, pp. 226–228, 1986.

*Primary Examiner*—Angela Ortiz
*Attorney, Agent, or Firm*—Wood, Herron & Evans, L.L.P.

[57] ABSTRACT

A non-disassembling partition assembly for insertion into a container for dividing the space inside the container into separated cells. The assembly comprises a plurality of first slotted partitions intersecting with a plurality of second slotted partitions to form a matrix. The matrix is held together in a non-disassembling collapsible relationship by a plurality of weldments at a plurality of intersections. Each weldment is formed by injection of molten plastic between opposed face plies of intersecting partitions at an intersection at a sufficiently high temperature, to at least partially melt the spacers beteween the face plies of the intersecting partitions to create a weldment therebetween. The weldments are formed of a plastic which is preferably the same type of plastic as that from which the partitions are made in order to aid in the recyclability of the partition assembly.

11 Claims, 4 Drawing Sheets

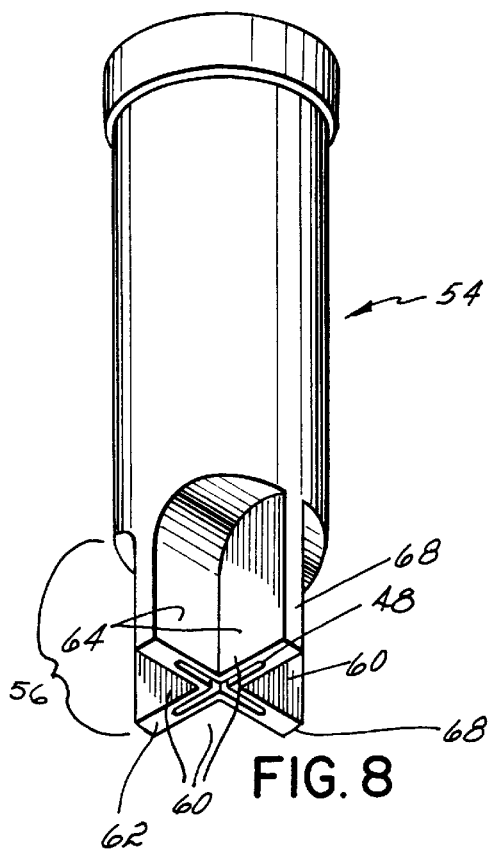
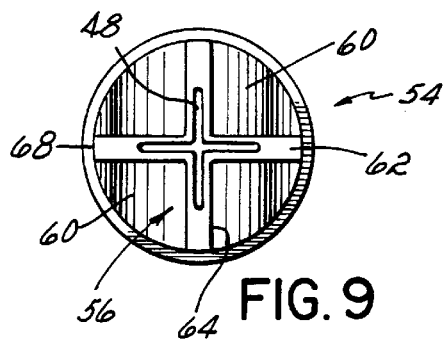
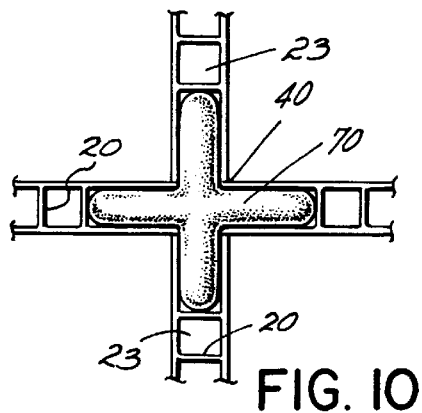
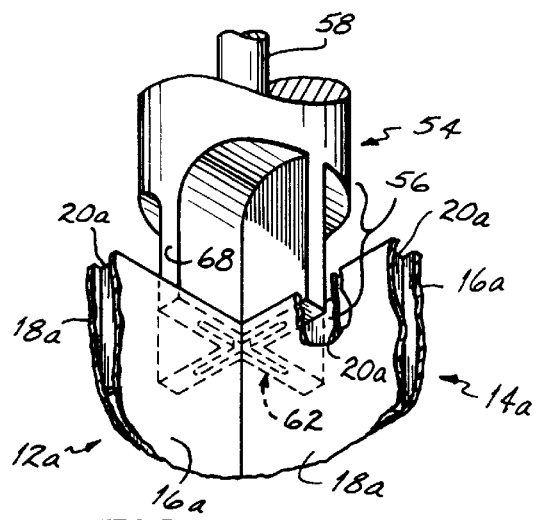
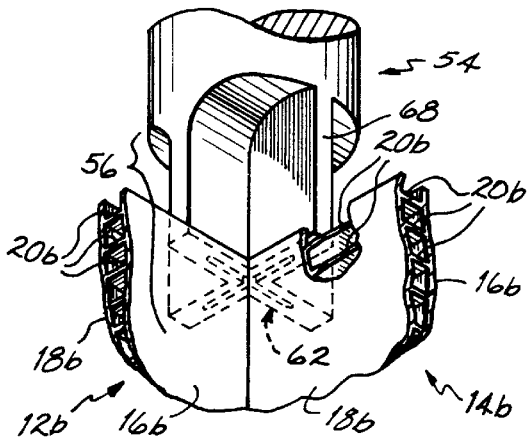

METHOD OF FORMING PARTITION MATRIX

CROSS-REFERENCE TO RELATED APPLICATIONS

This application is a divisional application of U.S. patent application Ser. No. 08/600,589, filed Feb. 13, 1996, now U.S. Pat. No. 5,732,876 entitled Welded Partition Assembly and assigned to the assignee of this application, which application is hereby incorporated by reference in its entirety. The application which matured into U.S. Pat. No. 5,732,876 is a Continuation-In-Part of U.S. application Ser. No. 08/559,619 filed Nov. 20, 1995 entitled Recyclable Container Partition and assigned to the assignee of this application, which application is herein incorporated by reference in its entirety.

FIELD OF THE INVENTION

The present invention relates to a non-disassembling partition assembly for dividing the space inside a container or box; more particularly to a non-disassembling partition assembly which is recyclable and made of plastic.

DESCRIPTION OF THE PRIOR ART

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual cells each of which is intended to hold a separate item for display or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of cells. The dividers are slotted in a manner that enables the dividers to engage with one another at the location of the slots so that the dividers form an orthogonal grid or matrix. Typically the dividers are made of the same material as the material of the box or container, plastic or paperboard. However, the dividers may be constructed of any suitable material with sufficient rigidity to prevent the contents of the container from contacting one another and being damaged.

Disassembling traditional partition assemblies comprise a series of individual slotted dividers which mesh together in an orthogonal grid or matrix. The assembly as a whole is generally collapsible but the individual dividers of the assembly may be removed from the assembly individually and stacked. To disassemble the array or matrix of dividers one must lift one of the slotted dividers up out of the box or container, disengaging its slots with the slots of the dividers orthogonal to it. Because the assembly is disassembling, the assembly may be stored in much less space than if the assembly were non-disassembling. A problem with this type of partition assembly, though, is that if one desires to re-use the assembly one has to re-engage the slots of the dividers and then place the assembly inside a box or container. Additionally, this type of partition assembly is subject to inadvertent disassembly whenever parts are removed from the cells of the partition assembly.

A more desirable partition assembly for many applications is one that is not fully disassembling with the individual dividers of the assembly affixed to each other. Such a nondisassembling assembly may be lifted as a whole out of a box without the operator worrying about the dividers separating from one another.

Several U.S. patents disclose non-disassembling, collapsible partition assemblies which separate the interior of a box or container into a plurality of cells. The collapsible divider assemblies disclosed in these patents generally have a first set of dividers extending in one direction intersecting orthogonally with a second set of dividers extending in a second direction. In many of these non-disassembling assemblies, a portion of either the longitudinal or transverse divider is cut out at each intersection and permanently affixed to the adjacent intersecting divider in order to make the assembly non-disassembling. In others of these nondisassembling assemblies, a flap added to either the longitudinal or transverse dividers is folded and permanently affixed to the intersecting divider.

One such non-disassembling partition assembly is disclosed in U.S. Pat. No. 4,621,764 wherein slotted cross strips of a collapsible partition assembly intersect and are joined to slotted longitudinal dividers. According to the disclosure of this patent, each of the cross strips has tabs cut from the center section of each cross strip adjacent the intersecting longitudinal divider, the tabs being folded into contact with and adhered to the longitudinal dividers to prevent the longitudinal dividers from separating from the cross strips.

Another non-disassembling slotted partition assembly is disclosed in U.S. Pat. No. 4,746,053. In this patent there is disclosed a non-disassembling partition assembly having a plurality of longitudinal slotted dividers inter-engaging a plurality of slotted transverse dividers. Triangular shaped tabs are cut and folded from the longitudinal dividers adjacent the top of each slot of the divider. These tabs are spot welded, stapled or otherwise secured to the transverse dividers to prevent the partition assembly from ever disassembling.

U.S. Pat. No. 3,942,709 discloses a slotted partition assembly having a plurality of parallel longitudinal dividers intersecting a plurality of cross dividers or so called tying strips. The end portions of the tying strips are bent along score lines and secured to the longitudinal dividers by a glue bond so as to prevent disassembly of the assembled partition assembly.

In each of these prior art patents, the longitudinal dividers are secured to the transverse dividers at specific locations only, namely those locations in which a portion of a divider has been cut or scored and folded along a perforation. The folded portion is then spot welded, glued or otherwise secured to the adjacent intersecting partition or divider. Such attachment or securement using tabs or folded portions of the dividers glued or otherwise secured to adjacent intersecting dividers is not always secure and may result in the tearing of the tabs and hence disassembly of the matrix. This method of securing the intersecting dividers is also costly due to the cost of cutting the tabs, assembling the partitions, folding the tabs and adhering or otherwise securing the tabs and adjacent partitions.

It has therefore been one objective of the invention to provide a non-disassemblable partition assembly which is secure and may not be easily disassembled.

It has been another objective of the present invention to provide a durable, sturdy, non-disassemblable partition assembly which is less costly to produce than prior disassemblable partition assemblies.

It has been another objective of the present invention to provide a less costly, non-disassemblable collapsible partition assembly in which the partitions are made of plastic and are recyclable.

SUMMARY OF THE INVENTION

The non-disassembling partition assembly of the present invention which accomplishes these objectives comprises a plurality of first slotted partitions intersecting with a plurality of second slotted partitions, both first and second slotted partitions being made of plastic. The plastic partitions have two face plies with a plurality of spacers therebetween. The spacers may be parallel corrugations or a middle ply of dimpled plastic. The intersecting first and second slotted partitions form a plurality of holding cells into which different parts are stored for shipment or display.

Each first slotted partition has a series of slots extending inwardly from an edge of the first slotted partition. Each second slotted partition has a series of slots extending inwardly from an edge of the second slotted partition. Preferably these slots are evenly spaced in order to make the cells which are formed by the intersecting partitions of identical dimensions. Each of the slots of the first slotted partitions extends inwardly from an edge of the first slotted partition to approximately the mid point of the first slotted partition. Each of the slots of the second slotted partitions extends inwardly from an edge of the second slotted partition to approximately the mid point of the second slotted partition.

Each slotted partition is formed of double faced plastic, the slotted partition having two outer face plys of plastic and a plurality of spacers between the face plies. The spacers may be a plurality of dimples pressed from a middle ply of plastic or alternatively, the spacers may be a plurality of parallel, evenly spaced corrugations, either vertically or horizontally oriented, two adjacent corrugations defining a flute. The corrugations and flutes between the face plies of the partitions may be vertically oriented or horizontally oriented. The distance between the two face plies and the distance between two adjacent corrugations define the size of the flutes.

Each slot of a first slotted partition is engaged with a slot of a second slotted partition at an intersection. A plurality of first slotted partitions engage with a plurality of second slotted partitions to form a partition matrix. The partition matrix is held together in an assembled relationship by a plurality of weldments at a plurality of intersections. Each weldment permanently secures an intersecting first and second slotted partition. Each weldment is proximate an edge of an intersection and is formed by a mass of molten plastic injected downwardly between the face plies of intersecting partitions at the intersection. A weldment does not necessarily exist at each intersection of a first and second slotted partition. A weldment may exist at only a few intersections or alternatively may exist at all intersections of a first slotted partition with a second slotted partition.

Preferably the weldments at the intersections of the assembly are made of the same composition of plastic as are the partitions themselves. In two preferred embodiments of the invention the plastic partitions and weldments are made of either polyethylene or polypropylene.

The weldments are preferably made of plastic which is molten and injected between the face plies of intersecting partitions at an intersection from a nozzle placed inside the face plies. Once the weldment plastic has cooled, the intersecting first and second slotted partitions are permanently secured to each other and the weldment must be broken in order for the partitions to be separated. The temperature of the weldment upon its release from a discharge orifice at the end of the nozzle is high enough so that the weldment may melt the spacers between the face plies at the intersection and if the temperature is sufficiently high may partially melt the face plies of either a first or second slotted partition at the intersection.

In a preferred embodiment of the present invention the weldment extends only partially down the intersection allowing the partition assembly to partially collapse into a collapsed assembled position while maintaining the assembly in an assembled, adhered relation. The capability of the assembly to collapse enables the assembly to be shipped or stored in a semi-flat condition and be reused when re-erected.

An alternative embodiment of the present invention includes a supporting net, preferably of plastic, attached to the top edge of the partition assembly. The supporting net is placed over the top edge of the partition assembly before the weldments have been applied to the intersections. The weldments, in addition to securing intersecting first and second slotted partitions, secure the supporting net to the top edge of the intersecting partitions. Once the supporting net is secured to the top edge of the partition assembly and the partition assembly is made non-disassembling by the weldments, the non-disassembling partition assembly is inverted so the supporting net is on the bottom of the assembly. The supporting net then acts as a bottom support or base, enabling items placed in the individual holding cells of the assembly to rest upon and be supported by the net and to be lifted out of the container housing the non-disassembling partition assembly simultaneously with the removal of the non-disassembling partition assembly.

BRIEF DESCRIPTION OF THE DRAWINGS

FIG. 8 is an enlarged perspective view of an alternative nozzle.

FIG. 9 is an end elevational view of the alternative nozzle of FIG. 8.

FIG. 10 is a top plan view of an intersection illustrating a weldment resulting from the use of the alternative nozzle of FIG. 8, the partitions having vertically oriented corrugations.

FIG. 11A is a perspective view illustrating how the nozzle of FIG. 8 is used to create the weldment of FIG. 10 binding two intersecting partitions having vertically oriented corrugations.

FIG. 11B is a perspective view illustrating the nozzle of FIG. 8 being used to create a weldment of two intersection partitions having horizontally oriented corrugations.

DESCRIPTION OF THE PREFERRED EMBODIMENT

Figure 1:
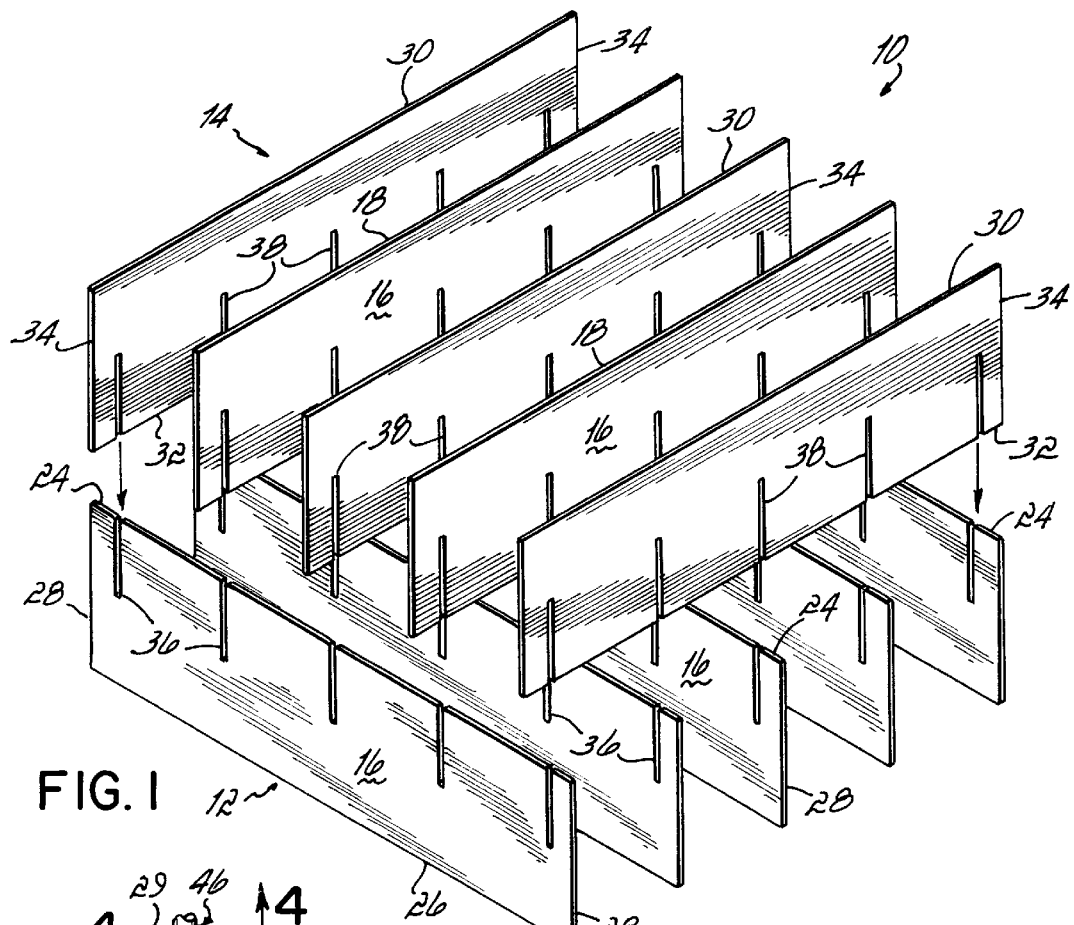
FIG. 1 is a perspective view of a plurality of first slotted partitions and a plurality of second slotted partitions before their engagement with each other to form a partition assembly.
Figure 3:
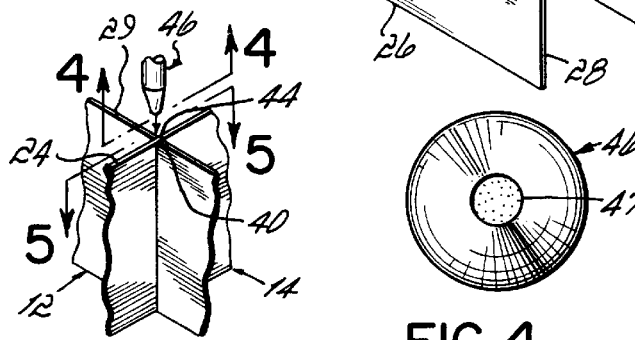
FIG. 3 is a perspective view, on a reduced scale, of an intersection of the assembled partition assembly illustrating a welding nozzle being lowered into the intersection.

Referring to the drawings and particularly to FIG. 1 there is illustrated the non-disassembling partition assembly of the present invention for dividing the space inside a container. The partition assembly 10 comprises a plurality of parallel first slotted partitions 12 intersecting with a plurality of parallel second slotted partitions 14. As shown in FIG. 1 the plurality of first slotted partitions 12 intersect with the plurality of second slotted partitions 14 to form the partition assembly 10.

Figure 5:
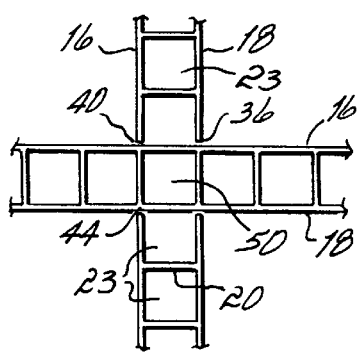
FIG. 5 is an enlarged top plan view of an intersection of the partition assembly of the present invention before a weldment is introduced taken along the lines 5—5 of FIG. 2.
Figure 11C:
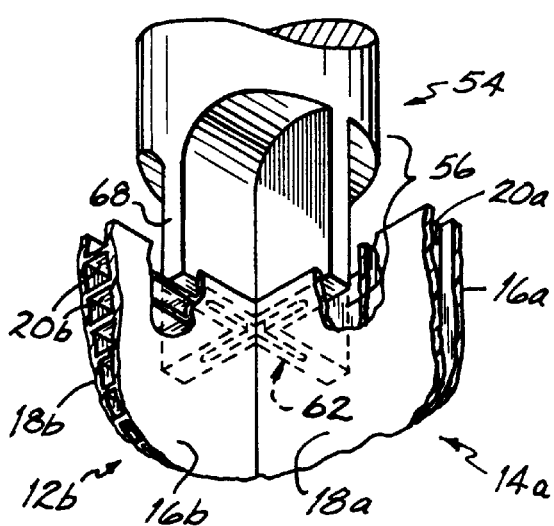
FIG. 11C is a perspective view illustrating the nozzle of FIG. 8 being used to create a weldment of two intersection partitions, one having horizontally oriented corrugations and the other having vertically oriented corrugations.
Figure 11D:
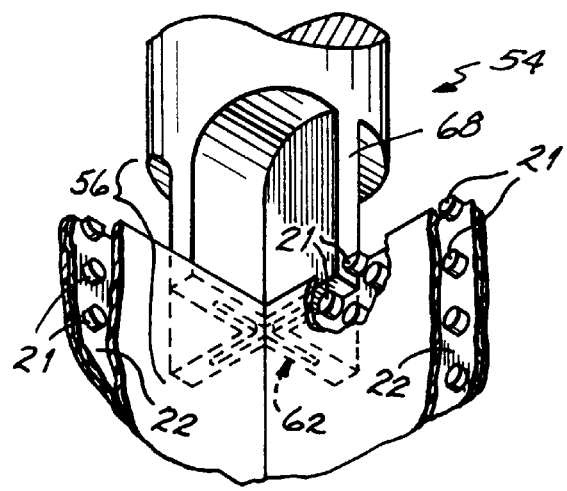
FIG. 11D is a perspective view illustrating the nozzle of FIG. 8 being used to create a weldment of two intersection partitions, the partitions having a dimpled plastic ply between two face plies.

Each of the first and second slotted partitions 12,14 are made of double face plastic with a plurality of spacers therebetween. The spacers may be a plurality of dimples punched out of a middle ply of plastic or a plurality of corrugations. The corrugations may be vertically or horizontally oriented. Each slotted partition has two face plies 16 and 18 which are parallel to one another as best illustrated in FIG. 5. Between the face plies 16, 18 are a plurality of spacers. As illustrated in FIG. 11A–C, the spacers may be a plurality of evenly spaced corrugations 20 between the face plys 16 and 18, the corrugations 20 being vertically or horizontally oriented. Alternatively, the spacers may be a plurality of dimples 21 protruding from a middle ply of plastic 22 as illustrated in FIG. 11D. The spacers may be other configurations as long as they separate the two face plies 16, 18. Two adjacent corrugations 20 define a hollow flute 23. The distance between adjacent corrugations 20 and the distance between the face plys 16 and 18 of a partition define the size of a flute 23. Each corrugated plastic partition has a plurality of parallel corrugations 20 defining a plurality of flutes 23 therebetween.

Each first slotted partition 12 has a planer top edge 24, a planar bottom edge 26 and two vertical side edges 28. Each second slotted partition 14 likewise has a planar top edge 30, a planar bottom edge 32 and two vertical side edges 34.

Each first slotted partition 12 has at least one slot 36 which extends downwardly from the top edge 24 of the first slotted partition 12 to approximately the mid point of the first slotted partition 12. The slots 36 may be evenly spaced apart in order so that the individual holding cells of the partition assembly may be evenly sized. Alternatively, the slots 36 may be unevenly spaced in order to form holding cells of the partition assembly of differing sizes adapted to accept different size parts. The slots 36 are shown as being vertical but may be horizontal if the partition assembly 10 is placed on edge.

Each second slotted partition 14 has at least one slot 38 each slot 38 extending upwardly from the bottom edge 32 of the second slotted partition 14 to approximately the mid point of the second slotted partition 14. The slots 38 of the second slotted partition 14 may also be evenly spaced in order so that the holding cells of the partition assembly may be evenly sized. Alternatively, the slots 38 may be unevenly spaced in order to form holding cells of the partition assembly of differing sizes adapted to accept different size parts. The slots 38 are shown as being vertical but may be horizontal if the partition assembly 10 is placed on edge.

The first slotted partitions 12 are arranged on edge on a horizontal surface in a spaced, parallel manner and the second slotted partitions 14 lowered downwardly in an interlocking arrangement with the first slotted partitions 12 to form a partition matrix. Each slot 36 of a first slotted partition 12 engages with a slot 38 of a second slotted partition 14 at an intersection 40.

The partition assembly 10 is prevented from disassembly by a plurality of weldments 42 at a plurality of intersections 40. A partition assembly 10 may have any number of weldments 42 up to one weldment 42 per intersection 40 as long as the slotted partitions do not separate from one another. The weldments 42 are inserted proximate an edge of intersections 40.

Figure 4:
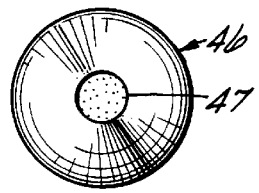
FIG. 4 is an end view of the nozzle taken along the lines 4—4 of FIG. 3.

As best illustrated in FIGS. 3 and 11A–D, to form a weldment 42, 70 at an intersection 40 a nozzle 46, 54 is lowered downwardly to an intersection 40. The tip of the nozzle 46, 54 as shown in FIGS. 4 and 9 may have either a round discharge orifice 47 as illustrated in FIG. 4 or a cross-shaped discharge orifice 48 as illustrated in FIG. 9 at the bottom of the nozzle 46, 54 which allows a quantity of extruded plastic to pass through the round or cross shaped orifice of the nozzle 46, 54 when a weldment is desired. The nozzle opening may also be configured in any manner other than a circle or a cross such as an oval, a square or an "L".

To weld the intersection 40, the nozzle 46 is lowered downwardly into a central flute 50 of an intersection 40 before the welding material is released through the nozzle 46 and out the orifice 47 into the central flute 50 at the intersection 40. A sufficient quantity of molten plastic passes through the nozzle 46 and ultimately through the orifice 47 in the nozzle tip at a high enough temperature and with sufficient retained heat to melt the spacers between the face plies 16, 18 of the intersecting partitions and convert them to a molten state. Ideally, the temperature of the molten plastic upon releasing from the discharge orifice is low enough so that although the molten plastic melts the spacers between the face plies 16, 18 the molten plastic does not melt the face plies 16, 18 of the intersecting partitions.

Figure 6:
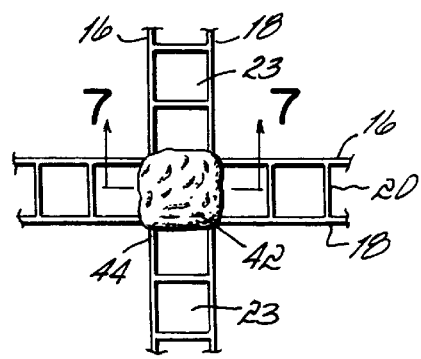
FIG. 6 is a top plan view of the intersection of FIG. 5 illustrating a weldment placed in a central flute of the intersection.
Figure 7:
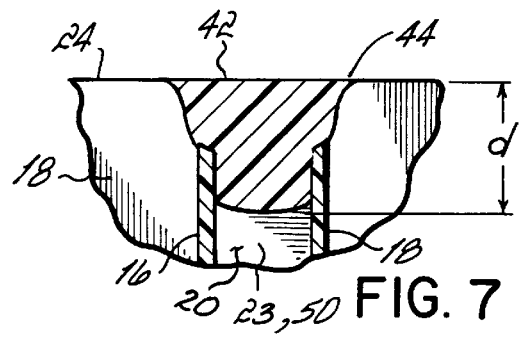
FIG. 7 is a cross-sectional view taken along the lines 7—7 of FIG. 6.

As shown in FIGS. 5, 6 and 7, the weldment material, a molten plastic of the same resin as the partition, preferably polyethylene or polypropylene is placed in a central flute 50 of an intersection 40. If a sufficient quantity of molten plastic is released through the discharge orifice 47, the molten plastic will spill over into flutes 23 adjacent the central flute 50 of the intersection 40. The central flute 50 is actually a flute in the second slotted partition 14 of the intersection 40, multiple corrugations 20 and sufficient widths of face plies 16, 18 of the first slotted partition 12 being cut out of the first slotted partition 12 to form the slot 36. Once the molten plastic is injected between the face plies 16, 18, melts a portion of the spacers, which may be corrugations, and then hardens, the molten plastic forms a secure weldment 42 preventing the first and second intersecting partitions 12,14 from disengaging from one another.

As best illustrated in FIG. 7, the molten plastic extends down a distance d into the interior of the central flute 50 of the intersection 40 before the molten plastic hardens into a weldment 42. Preferably the distance d of the molten plastic flows down the central flute 50 of the intersection 40 is one quarter to one half inch although it may extend for the full height of the intersection. Such weldments 42 enable the partition assembly to collapse and be resurrected for reuse.

The weldment 42 may be of many different materials but is preferably of the same material as the material of the partitions in order for the assembly to be easily recycled. The dividers and weldments are preferably made of polyethylene or polypropylene but may be of any other suitable plastic material.

FIG. 8 illustrates an alternative heated nozzle 54 which is cylindrical except for the end portion 56. Electrical heaters 58 are contained internally of the nozzle 54 (see FIG. 11A). The end portion 56 of this cylindrical nozzle 54 has four end cavities 60 formed as by milling, leaving a cross-shaped nozzle end 62 comprising two intersecting, perpendicular cross pieces 64. The two intersecting, perpendicular cross pieces 64 of the nozzle end 62 each have end surfaces 68. As seen in FIG. 9 a cross-shaped discharge orifice 48 is machined, as by electro-discharge machining in the two intersecting cross pieces 64 of the nozzle end 62.

In the use of this nozzle as seen in FIGS. 11A–D, the heated cross-shaped nozzle end 62 of the nozzle 54 is aligned with and inserted into the intersection 40 to be welded with the cross-shaped end 62 of the nozzle 54 entering between the face plies 16, 18 of the intersection partitions 12, 14 and melting down the spacers contacted by the end surfaces 68 of the two perpendicular cross pieces 64 of the nozzle end 62. After the end surfaces 68 of the two perpendicular cross pieces 64 of the nozzle end 62 have entered into the intersection 40 between the face plies 16, 18 of the intersecting partitions 12, 14 to a depth of approximately one to ten millimeters, the trigger of the welding gun (not shown) to which the nozzle 54 is attached is activated, causing molten plastic to be ejected from the cross-shaped discharge orifice 48 into the interior of an intersection 40 between the face plies 16, 18 of intersecting partitions. The molten plastic dispensed through the cross-shaped discharge orifice 48 of the nozzle end 62 enters within the face plies 16, 18 of the intersecting partitions at an intersection 40 rather than outside the face plies 16, 18 while partially melting the spacers between the face plies 16, 18 and forming a cross-shaped weldment 70 within the interior of the intersection 40. In the preferred embodiment, the weldment 70 is made of the same material as the plastic from which the partitions are made, as for example polypropylene, for ease of recyclability of the partitions, and is flexible so as to enable the welded partition assembly to be collapsed after removal from a container.

FIGS. 11A–D illustrate different types of partitions 12, 14 which may be used within the spirit of this invention. FIG. 11A illustrates intersecting partitions 12a, 14a each having vertically oriented corrugations 20a for spacers between the face plies 16a, 18a of the partitions 12a, 14a. FIG. 11B illustrates intersecting partitions 12b, 14b each having horizontally oriented corrugations 20b for spacers between the face plies 16b, 18b of the partitions 12b, 14b. FIG. 11C illustrates one 12b of the two intersecting slotted partitions 12b, 14a having horizontally oriented corrugations 20b between the face plies 16b, 18b and the other intersecting slotted partition 14a having vertically oriented corrugations 20a between the face plies 16a, 18a. In this configuration all the first slotted partitions 12b have horizontally oriented corrugations 20b and all the second slotted partitions 14a have vertically oriented corrugations 20a. However, not all parallel first slotted partitions need have corrugations oriented the same direction. Two adjacent parallel slotted non-intersecting, corrugated plastic partitions could have corrugations oriented differently; one first slotted partition having vertically oriented corrugations and an adjacent first slotted partition having horizontally oriented corrugations. FIG. 11D illustrates non-corrugated plastic slotted partitions having two face plies 16, 18 and a plurality of dimples 21 sandwiched between the face plies 16, 18. The dimples 21 are typically pressed out of a middle ply 22 of plastic.

Figure 12:
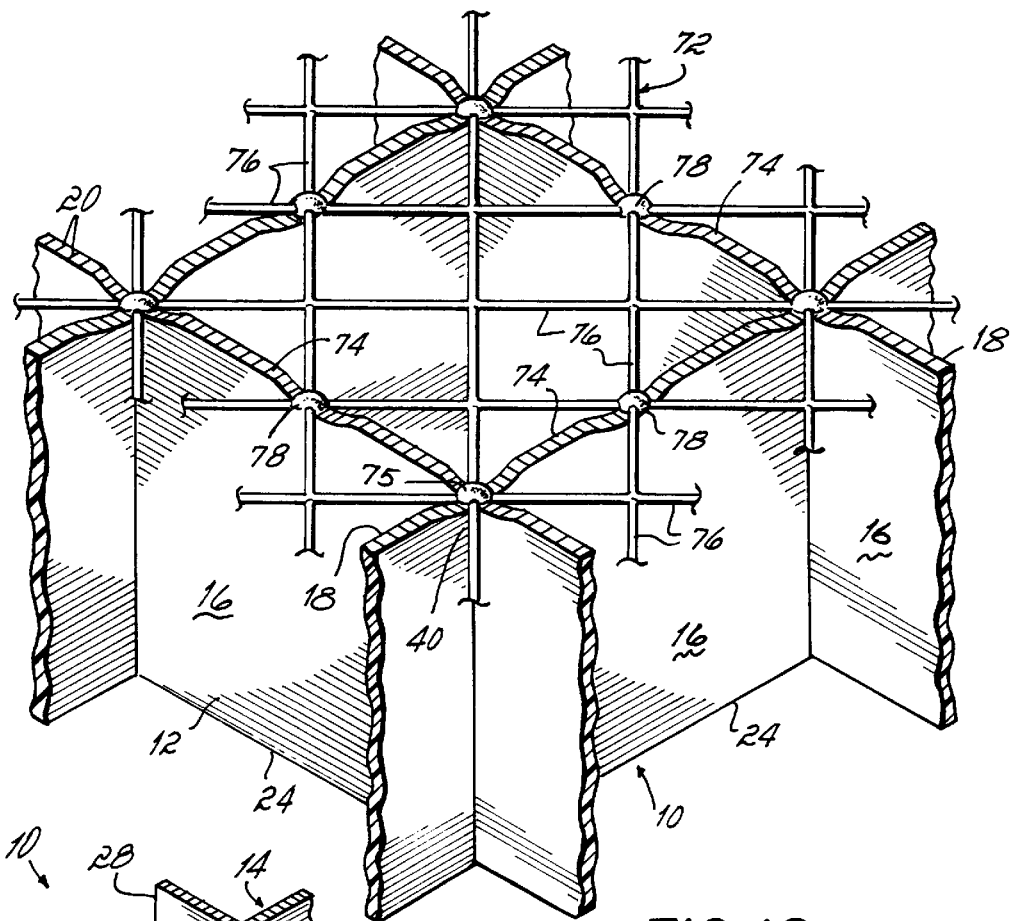
FIG. 12 is a perspective view of an alternative embodiment of the present invention having a supporting net attached to the partition assembly.
Figure 2:
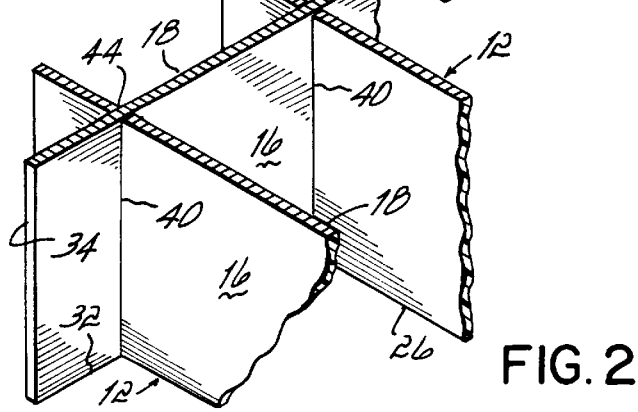
FIG. 2 is an enlarged perspective view of a portion of the partition assembly of FIG. 1 after assembly of the slotted partitions.

As illustrated in FIG. 12, an alternative embodiment of the present invention includes a supporting net 72 welded to the top edge 74 of the partition assembly 10. The supporting net 72 is placed on top of the partition assembly 10 before the intersecting partitions are secured to one another with weldments 75 at the intersections 40 of the partition assembly 10. The supporting net 72 is laid on top of the intersecting partitions so that it rests on the top edge 74 of the partition assembly 10. The supporting net 72 is aligned in relation to the partition assembly 10 so that one of the individual members 76 of the supporting net 72 crosses an intersection 40 of a first slotted partition 12 with a second slotted partition 14. The weldments 75 are then inserted at one or more intersections 40 of the partition assembly 10 such that the supporting net 72 is secured to the partition assembly 10 at the intersections 40 of the assembly.

The supporting net 72 itself consists of crisscrossing individual net members 76 which are made of plastic, preferably of the same composition as the composition of the partitions and weldments to aid in the recyclability of the partition assembly 10 as a whole. This net material is preferably polyethylene or polypropylene but may be any other flexible plastic net material.

As illustrated in FIG. 12, in addition to the weldments 75 at the intersections 40 securing the supporting net 72 to the partition assembly 10, additional weldments 78 may be placed at selected locations where the individual members 76 of the supporting net 72 cross either a first or second slotted partition. Such additional weldments 78 further secure the supporting net 72 to the partition assembly 10 and provide additional protection against disassembly. Once the supporting net 72 is secured to the top edge 74 of the partition assembly 10 the partition assembly 10 is then turned over so that the supporting net 72 is attached to the bottom edge of the partition assembly 10 and forms a bottom or base for the complete assembly.

This configuration of the partition assembly with the net bottom enables individual articles placed inside the holding cells of the partition assembly 10 to be lifted out of the box or container with the partition assembly 10 when the partition assembly 10 is lifted out of the box or container. The supporting net 72 because of its flexibility, does not hinder the collapsibility of the partition assembly 10 but simply folds up when the partition assembly 10 is collapsed.

While I have described only a single preferred embodiment of my invention, I do not intend to be limited except by the scope of the following claims:

I claim:

1. A method of forming a non-disassembling intersecting partition matrix, said matrix comprising at least one first slotted partition intersecting with at least one second slotted partition, each first and second slotted partition being made of double face plastic having multiple spacers sandwiched between two face plies, each first slotted partition having at least one slot extending inwardly from an edge of the first slotted partition, each second slotted partition having at least one slot extending inwardly from an edge of the second slotted partition, said method comprising the steps of:

engaging said at least one slot of said at least one first slotted partition with said at least one slot of said at least one second slotted partition at an intersection to form a matrix;

injecting molten plastic into a void between the face plies of intersecting partitions at at least one intersection, said void being formed at least in part by melting a portion of at least one spacer; and allowing said molten plastic to cool and solidify to permanently secure the intersecting partitions in a non-disassembling relationship.

2. The method of forming a non-disassembling intersecting partition matrix of claim 1 wherein said void is formed by a heated end of an injection nozzle.

3. A method of forming a non-disassembling intersecting partition matrix, said matrix comprising a plurality of first slotted partitions intersecting with a plurality of second slotted partitions, each first and second slotted partition being made of double face corrugated plastic having multiple corrugations sandwiched between two face plies so as to define hollow parallel flutes therebetween, each first slotted partition having a series of slots extending inwardly from an edge of the first slotted partition, each second slotted partition having a series of slots extending inwardly from an edge of the second slotted partition, said method comprising the steps of:

engaging at least one slot of a first slotted partition with a slot of a second slotted partition at an intersection to form a matrix;

lowering a heated nozzle into a central flute at said intersection, releasing molten plastic through an orifice in said heated nozzle into said central flute, said molten plastic at least partially melting the corrugations between the face plies of the intersecting partitions.

allowing said molten plastic to cool and solidify to permanently secure the intersecting partitions in a non-disassembling relationship.

4. The method of forming a non-disassembling intersecting partition matrix of claim 3 wherein the molten plastic flows through a cross shaped discharge orifice and forms a cross shaped weldment.

5. A method of forming a non-disassembling intersecting partition matrix, said matrix comprising a plurality of first slotted partitions intersecting with a plurality of second slotted partitions, each first and second slotted partition being made of double face corrugated plastic having multiple corrugations sandwiched between two face plies so as to define hollow parallel flutes therebetween, each first slotted partition having a series of slots, each slot extending from an edge of the first slotted partition towards the mid-point of said first slotted partition, each second slotted partition having a series of slots, each slot extending from an edge of the second slotted partition towards the mid-point of the second slotted partition, said method comprising the steps of:

engaging a slot of a first slotted partition with a slot of a second slotted partition at an intersection to form a matrix;

placing a supporting net over one edge of the matrix;

injecting molten plastic into at least one flute at at least one intersection to permanently secure the intersecting partitions in a non-disassembling relationship and secure the supporting net to the intersecting partitions, said supporting net and said partitions defining a plurality of holding cells, each holding cell being capable of storing one or more items, said supporting net enabling items placed in the individual holding cells to rest upon and be supported by the net.

6. The method of forming a non-disassembling intersecting partition matrix of claim 5 wherein the molten plastic is injected into a plurality of said flutes at a plurality of intersections.

7. The method of forming a non-disassembling intersecting partition matrix of claim 5 wherein the molten plastic is injected into a plurality of additional flutes, said additional flutes being at locations in which the supporting net crosses a partition in order to secure said supporting net to said partition matrix.

8. The method of forming a non-disassembling intersecting partition matrix of claim 5 wherein said weldments and said supporting net are of the same general plastic composition for ease of recyclability.

9. A method of forming a non-disassembling intersecting partition matrix, said matrix comprising a plurality of first slotted partitions intersecting with a plurality of second slotted partitions, each first and second slotted partition being made of double face corrugated plastic having multiple spacers sandwiched between two planar face plies, each first slotted partition having a series of slots, each slot extending inwardly from an edge of the first slotted partition, each second slotted partition having a series of slots, each slot extending inwardly from an edge of the second slotted partition, said method comprising the steps of:

engaging the slots of the first slotted partitions with the slots of the second slotted partitions at intersections to form a matrix, said partitions of said matrix defining a plurality of openings in a first plane, said first plane being defined by coplanar edges of said partitions;

placing a supporting net comprising crisscrossing individual net members over the intersecting partitions generally in said first plane such that said individual net members pass over said openings, and securing the supporting net to the intersecting partitions by injecting molten plastic between the planar face plies at selected intersections and allowing said molten plastic to cool; and turning said partition assembly over so that items may rest upon and be supported by the supporting net.

10. The method of forming a non-disassembling intersecting partition matrix of claim 9 further comprising placing additional weldments at select locations where the individual net members of the supporting net cross a partition.

11. The method of forming a non-disassembling intersecting partition matrix of claim 9 wherein said molten plastic, said partitions and said supporting net are of the same general plastic composition for ease of recyclability.

\* \* \* \* \*